July 5, 1938.　　　A. J. SCHOLTES　　　2,122,725
TUBE DEFORMER
Filed Dec. 1, 1936　　　2 Sheets-Sheet 1
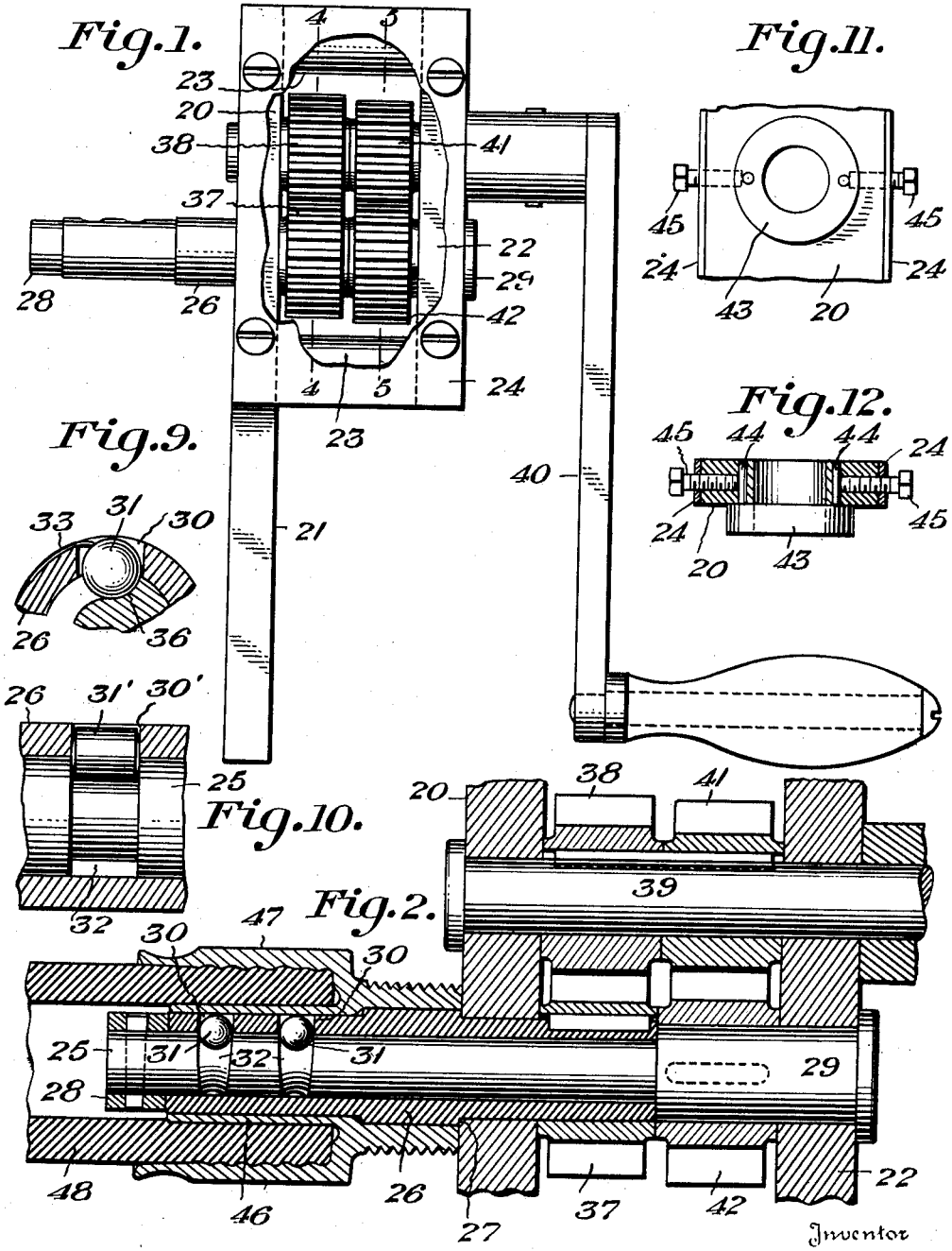
Inventor
Albert J. Scholtes
By Mawhinney & Mawhinney
Attorneys July 5, 1938.  A. J. SCHOLTES  2,122,725
TUBE DEFORMER
Filed Dec. 1, 1936  2 Sheets—Sheet 2
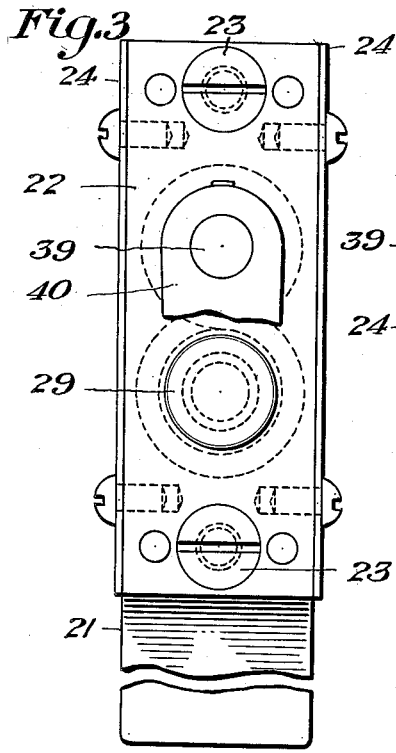
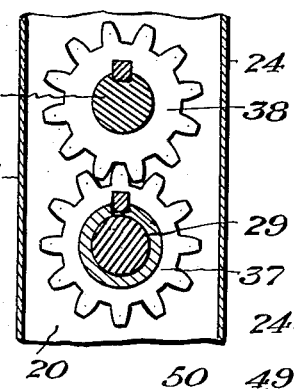
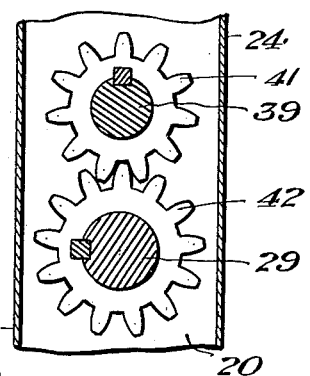
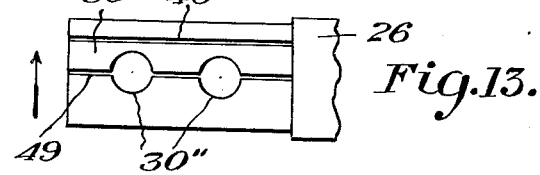
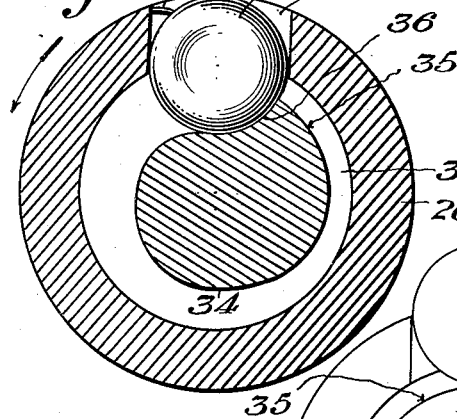
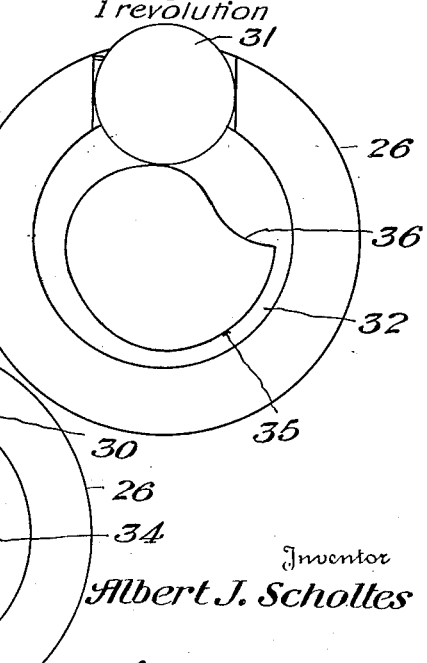
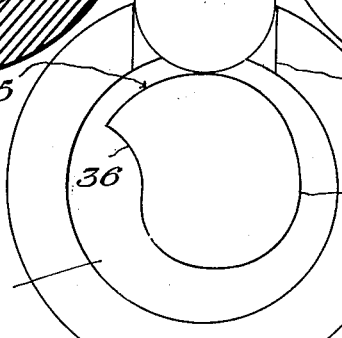
Inventor
Albert J. Scholtes
By Mawhinney & Mawhinney
Attorneys Patented July 5, 1938

2,122,725

UNITED STATES PATENT OFFICE 2,122,725

TUBE DEFORMER

Albert J. Scholtes, Baltimore, Md., assignor to Scovill Manufacturing Company, Waterbury, Conn., a corporation of Connecticut Application December 1, 1936, Serial No. 113,732

5 Claims. (Cl. 153—73)

The present invention relates to a deformer for tubes, couplings for hose and pipes, and the like, wherein the wall of the tube or coupling is grooved or deformed to interfit with hose, pipes or other parts between which a tight, strong and even connection is desired.

Heretofore, expanders have been of the plural-jaw type requiring such great force for operation to expand a portion of the tube or pipe that they are not capable of withstanding the pressure, particularly in small diameter tubes. Furthermore, the jaws produce an uneven corrugation or groove which is not leak proof, effects cutting of the hose or pipe secured over the corrugated tube, and frequently weakens and fractures the tube during the expanding action. It is well known that deforming sheet metal by pressure springs the metal out of normal shape and there is an inherent tendency for the metal to spring back toward normal condition, whereas in rolling the sheet metal into deformed shape the metal is permanently deformed without any tendency to spring back to normal shape and the metal is evenly or uniformly rolled without localized stresses tending to crack, thin and weaken the structure, and without any uneven pressure distorted portions leaving projections or roughened surface portions on the finished product.

The present invention has for an object to take advantage of the rolling action for deforming or corrugating the tube, and also provides a structure capable of efficient operation in relatively small as well as relatively large diameter tubes, a structure wherein the effective pressure and strain on the parts is reduced to a minimum, a structure which may be in the form of a mandrel for insertion in the end of the tube or be otherwise formed to operate on the exterior surface of the tube, and a structure which may be quickly operated and is adapted to quantity production.

Another object of the invention is to provide a tube expander or deformer of this character wherein a ball or a roller may be employed as the rolling element for operation against the tube wall to corrugate or deform the same; wherein the advancing operation is effected wholly in a direct radial direction without any axial thrust between the parts or against the tube; and wherein the advancing action is simultaneous with the rotary rolling action through the initial portion of the cycle of operation of the device to impart the desired depth to the corrugation in the tube wall and the remainder of the cycle of operation effects the final rolling of the corrugation to the final form and returns the parts to their initial positions ready for a subsequent operation.

A further object of the invention is to provide a novel arrangement of gears for operating the device to effect the combined rolling and advancing actions of the rolling element of the device.

Another object of the invention is to provide an adjustable gauge for limiting the reception of the work or tube on the mandrel of the device so as to determine the positions of the one or more corrugations to be formed in the tube by the device.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation, partly broken away, of one form of a tube deformer embodying the features of the present invention.

Figure 2 is a fragmentary enlarged longitudinal section taken through the same, a hose with an end coupling thereon shown applied to the device.

Figure 3 is an outer end elevation of the device with the handle and bracket arm partly broken away.

Figure 4 is a detail transverse section taken substantially on the line 4—4 of Figure 1, showing the direct drive gears for the outer shaft or member of the device.

Figure 5 is a similar view taken substantially on the line 5—5 of Figure 1, showing the differently proportioned drive gears for the inner shaft or member of the device.

Figure 6 is an enlarged transverse section taken through the mandrel or tube receiving portion of the device, the parts being in initial position for receiving a tube or coupling element.

Figure 7 is a diagrammatical view of the same, showing the relative positions of the parts after one revolution of the mandrel in accordance with the gear ratios illustrated.

Figure 8 is a like view, showing the positions of the parts after five revolutions of the mandrel according to the particular example illustrated.

Figure 9 is a fragmentary transverse sectional view through the mandrel, showing means for yieldingly holding the rolling element thereto.

Figure 10 is a fragmentary longitudinal section through a slightly modified form of mandrel, showing a roller instead of a ball as the rolling element.

Figure 11 is a fragmentary inner face view of the mandrel support, showing an adjustable stop for determining the location of formation of the groove or deformed portion of the tube.

Figure 12 is a horizontal section taken through the same.

Figure 13 is a fragmentary side elevation of the mandrel, showing a modified construction of the outer shaft to yieldably hold the rolling elements therein.

In the present illustrated form of the invention the device is of mandrel construction for insertion into the end of a tube, coupling or the like for operation to expand a portion of the tube.

The device is provided with a frame of any suitable size and construction and may have an outer face plate 20 provided at its lower end with a bracket arm 21 by means of which the device may be mounted on a bench or the like. An inner face plate 22 is held in spaced relation to the outer plate 20 by spacers 23 having their end screws countersunk in the outer faces of the plates 20 and 22. Side plates 24 may be secured across the edges of the plates 20 and 22 for housing in the gears for operating the device.

Mounted on the frame is a pair of concentric shafts 25 and 26. The outer shaft 26 is hollow and is journalled in the face plate 20 with a shoulder 27 bearing against the face plate 20 to hold the shaft 26 against axial movement. The inner shaft 25 may be solid, or otherwise, and is mounted for rotation in the outer shaft 26 and is held from axial movement therein by an end collar 28 pinned or otherwise secured on the shaft 25 and bearing against the outer end of the shaft 26, and by a stepped or enlarged portion 29 journalled in the inner face plate 22 of the frame and bearing against the inner end of the shaft 26.

The outer shaft 26 has one or more longitudinally spaced apart guide openings 30 in its side for slidably receiving therein each a rolling element 31 which may be a ball as shown in Figures 6 and 9, and each opening 30 is of sufficient size or diameter for the passage of the ball 31 therethrough to an extent at least sufficient to roll to the desired depth against the wall of a tube or the like.

The inner shaft 25 is a cam shaft with a circumferential cam groove 32 in register with each opening 30, and the inner side of the respective rolling element is seated in the cam groove 32. Each groove 32 has a cam bottom wall which, as shown in Figure 6 particularly, has its deepest portion sufficient to admit the retraction of the ball 31 substantially flush with the outer surface of the outer shaft 26 so that a tube may be freely slid over the mandrel or concentric shaft structure. A spring 33 is seated in the outer face of the shaft 26 and bears against the ball 31 to normally hold the same in the cam groove 32.

Figure 6 shows the parts in their initial positions ready to receive the work, and also after the operation on the work has been fully completed. The cam groove 32 gradually decreases in depth for a desired circumferential distance, such as, substantially through 270° as shown. The bottom wall of the groove 32 thus forms a spiral portion 34 radiating outward in its progression from the axis of the shaft 25 and gradually advances the ball 31 radially outward through the guide slot 30 as the ball 31 is carried around in the groove 32 by the outer shaft 26 when turned relatively to the inner cam shaft 25.

The last portion of the cam groove 32 constitutes the hiatus of the cam and may be concentric to the axis of rotation of the shafts 25 and 26 and provides a dwell 35 maintaining the ball 31 extended or advanced to the fullest desired extent during the final rolling action of the ball against the tube wall to insure the final uniform rolling of the corrugation entirely about the tube. The dwell 35 of the cam ends in a return shoulder 36 which may be shaped to the configuration of the rolling element 31 and which leads into the initial deepest portion of the cam or groove 32. Any suitable means may be provided for turning the mandrel in a tube to roll the ball thereagainst and at the same time to advance the ball against the tube for deepening the groove to the desired depth during the rolling action. The preferred means herein shown is an arrangement of gears mounted in the frame. The inner end of the outer shaft 26 has a gear 37 keyed thereon and meshing with a second gear 38. In the arrangement shown these gears 37 and 38 are of like size, such as both having twelve teeth. The gear 38 is keyed to a drive shaft 39 journalled in the face plates 20 and 22 and extending beyond the latter to receive a driving device, such as a crank handle 40. A third gear 41 is keyed to the drive shaft 39 and meshes with a fourth gear 42 keyed on the inner end of the inner mandrel shaft 25. The gears 41 and 42 are of different sizes in the arrangement shown, such as the gear 41 has eleven teeth while the gear 42 has thirteen teeth so that the inner shaft 25 of the mandrel turns at a rate of speed less than that of the outer mandrel shaft 26. Of course the relative sizes of the gears 37, 38, 41 and 42 may be otherwise arranged or interposed to meet conditions of structure and rotation of the cam shaft 25 and the carrying outer shaft 26 for the rolling element 31.

The rolling element may be, as shown in Figures 9 and 10, in the form of a roller 31' slidable through a correspondingly shaped guide slot 30' in the outer shaft 26. The inner shaft 25 has a cam groove 32 the bottom of which is shaped to the configuration of the roller 31' to receive and advance the same in the manner disclosed in connection with the ball 31.

To limit the insertion of the tube or coupling over the mandrel and to thus determine the innerspacing of the corrugations to be formed in the tube, an adjustable stop 43, Figures 11 and 12, may be used. The stop 43 is shown in the form of a ring or collar adapted to slide over the mandrel and is held to the outer face plate 20 by studs 44 slidably engaging in correspondingly forward openings in the plate 20. The studs 44 hold the stop 43 in line with the mandrel opening in the plate 20 and are secured in the plate by set screws 45 when the stop 43 is adjusted axially of the mandrel. The tube or coupling strikes the stop and the latter limits the extent of movement of the tube as it is fitted over the mandrel.

The gears 37, 38, 41 and 42 may be proportioned to turn the mandrel any desired number of times to complete the cycle of operation of the cam 32 on the rolling element 31 and effect the rolling of the corrugation to the desired depth. In the present illustrated embodiment the gears are proportioned to complete the cycle in six and one half turns of the mandrel. The mandrel is in normal initial position when the parts are in the position shown in Figures 1, 2 and 6, with the rolling element 31 fully retracted and ready to receive the tube 46. The tube 46 may be the inner portion of a coupling piece 47 of a hose coupling to be secured on the end of a hose 48, the object being to corrugate the tube 46 and force the corrugations into the hose 48 to compress the hose and lock it in the coupling piece 47. The coupling, fitted to the end of the hose 48, is fitted over the mandrel and held against turning by a wrench or other suitable means. The drive shaft 39 is now turned and the gears 38 and 41, keyed thereto, are rotated with the shaft. The outer shaft 26 of the mandrel is turned at the same rate of speed, through the gears 38 and 37 of the same size, as that of the drive shaft 39 and carries the rolling element 31 around the inner wall of the tube 46. The inner cam shaft 25 is turned, through the smaller gear 41 and the larger gear 42 at a less rate of speed than the outer shaft 26 with the result that the rolling element is gradually carried over the surface of the cam 32 and is thus gradually projected radially against the tube 46 to deform or corrugate the same. The cam 32 rises in a direction relative to the direction of rotation of the shafts 25 and 26 and with reference to the gear arrangement and the direction of drive of the gears to effect the movement of the rolling element.

During the first revolution of the mandrel, as a whole, the rolling element is projected radially substantially into the position shown in Figure 7, and the cam 32 continuously and gradually advances the rolling element 31 against the tube, during the rolling action, throughout substantially the first five revolutions of the mandrel or until the rolling element 31 rests on the dwell 35 of the cam, as shown in Figure 8. Here the rolling element is in its outermost position and the desired full depth of the corrugation in the tube 46 is reached. The last turn of the mandrel carries the rolling element over the dwell 35 of the cam and imparts a finished rolling to the tube corrugation, at which time the return shoulder 36 of the cam is carried from beneath the rolling element 31 and the latter drops back into initial position to release the coupling and to receive the next tube.

The modified form of the outer shaft 26, shown in Figure 13, provides socket or guide openings 30" which are of slightly less dimensions than the balls 31, or other rolling elements used, and the shaft 26 has longitudinal slits 49 spaced circumferentially in the shaft and preferably opening through the end of the shaft with one slit 49 intersecting the socket openings 30" to provide a spring tongue portion 50 adapted to yield under pressure of the cam actuated rolling elements to enlarge the socket openings 30" and admit radial advancement of the rolling elements under action of the cam for engagement with the wall of the tube.

What is claimed is:

1. A tube deformer comprising a pair of inner and outer concentric members adapted for positioning in a tube, said inner member having an annular radial cam groove therein, said outer member having an opening in the plane of said cam groove, a ball interposed between said members and resting in said cam groove, and means for turning said members in the same direction with one member at a greater rate of speed than the other to advance the ball against the tube during turning operation.

2. A tube expander, comprising a frame, a pair of concentric mandrel shafts journalled in the frame and projecting therefrom to receive a tube thereover, a drive shaft in the frame, a pair of gears keyed to the drive shaft to turn therewith, a gear on the outer concentric shaft meshing with one of the drive gears, another gear on the inner concentric shaft meshing with the other gear on the drive shaft, the sizes of the drive shaft and concentric shaft gears being different to turn the concentric shafts in the same direction but at different rates of rotation, the outer mandrel shaft having an opening through the side thereof, a deforming element mounted for radial movement through the opening in said outer shaft, said outer shaft bearing against the inner wall of the tube opposite to said deforming element, and a circumferential cam on the inner concentric shaft in the plane of the opening of the outer shaft for supporting the deforming element against the tube wall, said cam having a single continuous rise in its circumference, whereby upon the relative turning of the concentric shafts the deforming element is moved about the inner wall of the tube and advanced thereagainst to deform the same.

3. A tube expander, comprising outer and inner concentric shafts, a rolling element slidably mounted for radial movement through the outer shaft, a circumferential cam on the inner shaft engaging the rolling element and having a single continuous rise in its circumference, a drive shaft, a gear on the drive shaft, a second gear on the outer shaft meshing with the gear on the drive shaft to turn the outer shaft and rotate the rolling element thereabout, a third gear on the drive shaft, and a fourth gear on the inner shaft meshing with said third gear to turn the inner shaft in the same direction as that of the outer shaft, said first and second gears having a different size ratio relatively to the size ratio of the third and fourth gears.

4. A tube expander, comprising concentric shafts for insertion into a tube, turning means for rotating the shafts at different rates of speed in the same direction, the outer concentric shaft bearing against the tube wall to support the same and having socket openings in its side and circumferentially spaced apart longitudinal slits therein with one slit intersecting the socket openings to provide a spring tongue section at the marginal edge portions of the socket openings, deforming elements mounted in the outer shaft projecting outwardly in said socket openings and having a dimension slightly greater than that of the socket openings to yieldingly retain the deforming elements in the shaft, and circumferential cams on the inner shaft in line with the socket openings and bearing against the deforming elements and adapted to advance the same radially outward against the tube through said socket openings against the tension of said spring tongue section of the outer shaft.

5. A tube deformer comprising a pair of inner and outer concentric members adapted for positioning in a tube, said inner member having an annular radial cam groove therein, said outer member having an opening in the plane of said cam groove, a rolling element interposed between said members and resting in said opening and in said cam groove, said cam groove having a low spot for initially supporting the rolling element in inoperative position and having a continuous rise from said low spot to a high spot in the cam groove to gradually project the rolling element through the opening in the outer member and having a drop from said high spot to said low spot to return the rolling element to initial position, and means for relatively turning said members, whereby upon the relative turning of the members the rolling element is advanced against the inner wall of a tube to deform the same.

ALBERT J. SCHOLTES.